Figure 1:
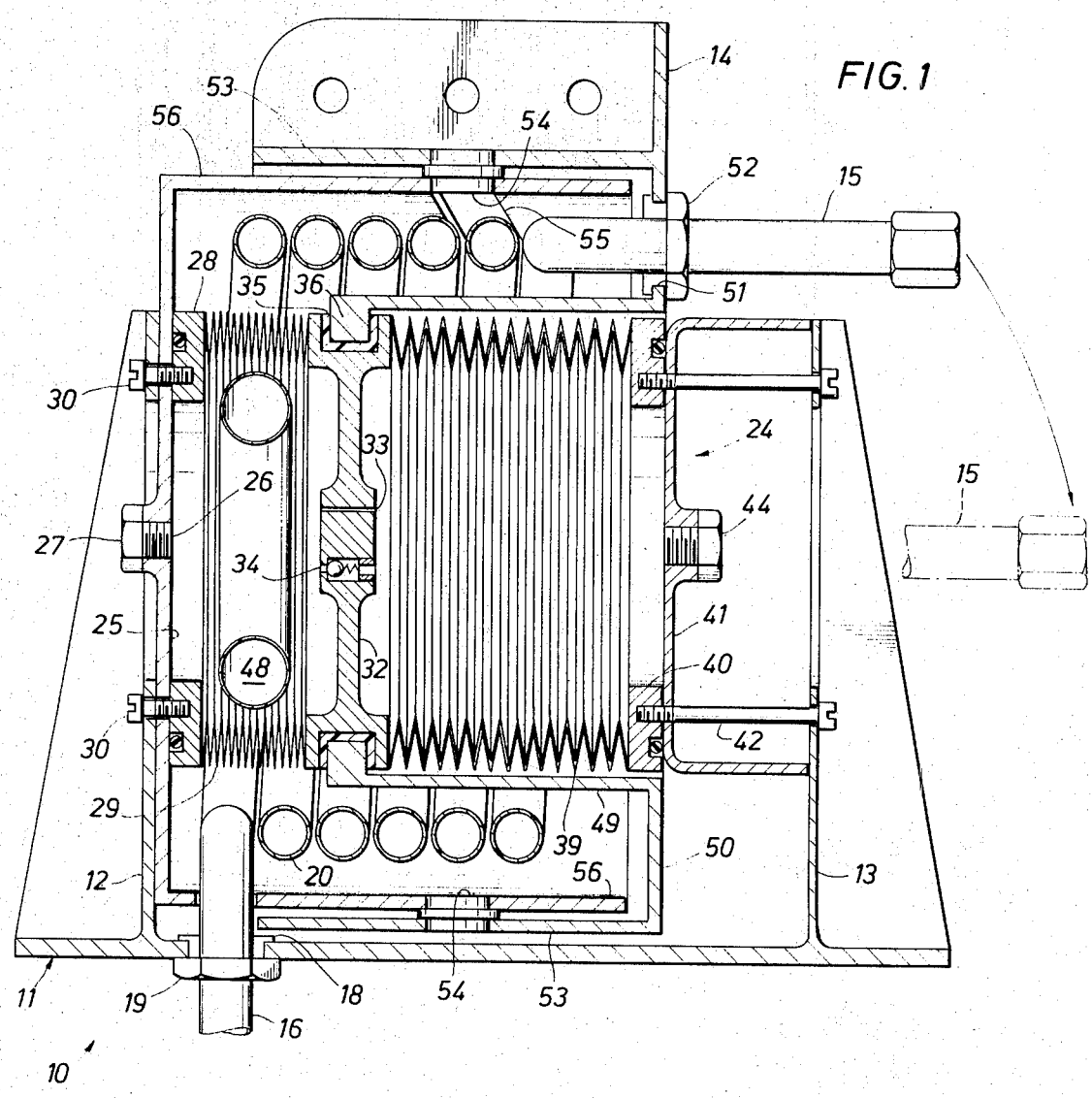

United States Patent

[11] 3,563,307

| [72] | Inventors | Thomas O. Paine,<br>Deputy Administrator of the National Aeronautics and Space Administration in respect to an invention of;<br>Hans M. Kolstee, Glen Cove; William E. Simpson, Rego Park, N.Y. |
|---|---|---|
| [21] | Appl. No. | 668 |
| [22] | Filed | Feb. 2, 1970 |
| [45] | Patented | Feb. 16, 1971 |

[54] RADIATOR DEPLOYMENT ACTUATOR
6 Claims, 2 Drawing Figs.

[52] U.S. Cl. ..................................................... 165/86,
244/1, 244/57, 165/44, 188/88
[51] Int. Cl. ........................................................ F28d 11/00
[50] Field of Search ........................................... 165/82, 83, 86; 244/1, 55

[56] References Cited
UNITED STATES PATENTS

| 1,549,202 | 8/1925 | McClane ...................... | 244/57 |
|---|---|---|---|
| 3,260,305 | 7/1966 | Leonard et al. ................ | 165/67 |
| 3,347,309 | 10/1967 | Redding et al. ................ | 165/86 |
| 3,402,761 | 9/1968 | Swet ............................. | 244/1 |

*Primary Examiner*—Martin P. Schwadron
*Assistant Examiner*—Theophil W. Streule
*Attorneys*—W. A. Marcontell, Marvin F. Matthews and G.T. McCoy

ABSTRACT: An apparatus for mounting a radiator or other fluid-communicated vessel for hinged movement which includes a fluid line formed of spring material which is coiled within a housing and which tends to uncoil for deployment of the radiator, the rate of deployment being controlled by a damping means within the housing.

PATENTED FEB 16 1971  3,563,307

Hans M. Kolstee
William E. Simpson
INVENTORS

BY

ATTORNEYS

RADIATOR DEPLOYMENT ACTUATOR

The invention described herein was made in the performance of work under a NASA Contract and is subject to the provisions of Section 305 of the National Aeronautics and Space Act of 1958, Public Law 85-568 (72 Stat. 435; 42 U.S.C. 2457).

SUMMARY OF PROBLEM AND INVENTION

The need for streamlining an airplane, spacecraft, or the like, is a very significant requirement limiting the design of the craft and its various components. Spacecraft and airplanes are sometimes equipped with coolant systems which are intended to surrender substantial quantities of heat to the surrounding space. Optimum cooling is obtained by exposure of a large surface area to the surrounding space and to this extent, this requirement is contradictory to the streamlining requirements for the spacecraft or airplane.

The apparatus of the present invention may be installed on a spacecraft or airplane for deployment of a coolant radiator, or other fluid-communicated device, while yet maintaining the streamlining of the craft in question. The present invention permits the fluid-communicated device to be folded to a recessed, more streamlined position, and at some selected time, moves the coolant radiator or other fluid-communicated device to a deployed or cooling position. It will be understood that deployment is achieved when streamlining is not so critical, and, or of course, the apparatus may be retracted to its original or streamlined position. The deployment actuator of the present invention functions bidirectionally and repetitively.

The present invention is summarized as including a housing adapted to be connected to the spacecraft or airplane, and has a fluid inlet for receiving the coolant. The fluid inlet is connected with several turns of tubing which tend to uncoil and rotate the fluid outlet to a deployed position. The fluid outlet is connected with the coolant radiator. The coiled tubing uncoils at a rate controlled by a damper means which is comprised of two bellows communicated with one another by a restricted passage such that the rate of flow between chambers is controlled. The two chambers are positioned within the several coils of the tubing and suitable connective structure between the damping means and the tubing slows the rate of deployment through operation of the damping means.

Figure 2:
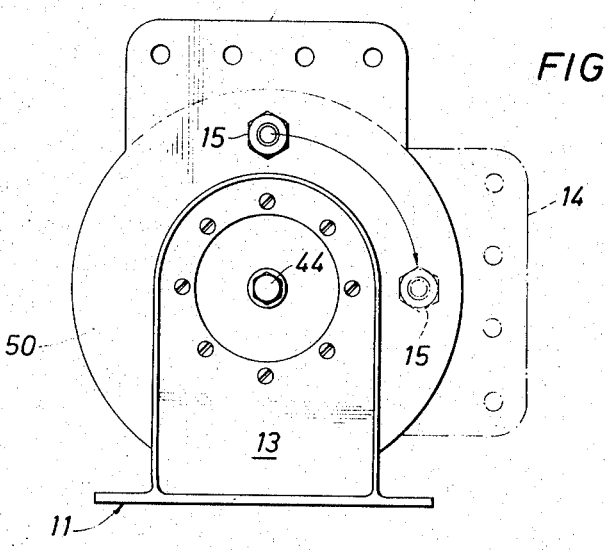

Many objects and advantages of the present invention will become more readily apparent from a consideration of the following specification which makes references to the following drawings:

FIG. 1 is a sectional view through the center of the deployment actuator of the present invention; and FIG. 2 is an end view of the structure shown in FIG. 1, showing the recessed position of the apparatus in full line and the deployed position of the apparatus in dotted line.

In the drawings, the numeral 10 indicates the deployment actuator means of the present invention generally. The deployment actuator includes a fixed housing 11 which is adapted to be connected with the spacecraft or airplane at some suitable point, typically near the skin of the craft and in the proximity of a coolant-circulating system for connection thereto. The fixed housing 11 incorporates a pair of upstanding supports 12 and 13 between which the greater portion of deployment actuator is located. The upstanding supports 12 and 13 are preferably parallel to one another, and are constructed with suitable mounting holes and the like for support of the deployment actuator 10.

The numeral 14 identifies a movable mounting bracket which rotates and translates in conjunction with a fluid outlet 15. The numeral 16 indicates a fluid inlet which is in communication with the outlet 15. Briefly, the housing 11 is connected with the spacecraft or airplane at a suitable point on the structure, and the fluid inlet 16 is connected with the coolant system in the spacecraft. A fluid-communicated device, such as a coolant radiator or the like, is attached to the mounting bracket 14 and connected with the fluid outlet 15. Thus, the apparatus provides structural support for the coolant radiator, and fluid path. As shown in both FIGS. 1 and 2, the coolant radiator is both rotated and translated during deployment. The deployment actuator 10 of the present invention will now be described in detail, and its operation will be related to the brief description above.

Beginning with the fluid line, the inlet 16 is secured in location by a threaded eyelet 18 having a upstanding flange and is locked in position by a nut 19. The fluid line is indicated by the numeral 20, and is preferably formed into perhaps between four and eight turns of coiled tubing. The tubing is indicated by the numeral 20 and includes the straight portions as well as the coiled portions of the fluid line. The tubing 20 is preferably a resilient material, an the several turns thereof will be referred to hereinafter as a hollow torsion spring which is motive force causing deployment of the coolant radiator. The full line position of FIG. 1 shows the fluid outlet 15 in the upper portions of the view, whereas the deployed position is achieved after 90° of rotation, at which juncture the several coils of the tubing are in the extended position.

A damping means 24 controls the rate of deployment as mentioned before. The damping means is received within the coiled pipe 20, and is preferably comprised of fluid-filled bellows. The numeral 25 indicates the end plate of the damping means, which is bolted to the upright support 12. The back plate 25 includes a centrally located filling port 26 which is closed by a suitable threaded plug 27. A circular structural member 28 is joined to a first set of bellows 29. The numeral 30 indicates a plurality of bolts which extend through the upright support 12, the back plate 25, and into the circular structural member 28 for pulling it snugly against the back plate 25 to seal thereagainst through the use of an O-ring captured within a slot as shown in the drawings. The circular structural member 28 and the bellows 29 are preferably joined together by means well known in the art with a number of folds of the bellows permitting expansion or contraction of the length of the bellows 29 as will be described hereinafter. The bellows 29 extend from the circular structural member 28 and connect to a centrally located movable partition 32. The partition 32 captures fluid within the bellows 29 subject to escape only through a small orifice 33 through the partition 32. Additionally, a check valve 34 permits flow from the bellows 29, but not into the bellows 29 for purposes and reasons as will be discussed hereinafter.

The movable partition 32 incorporates a support bearing 35 for a captive guidance ring 36. The ring 36 is connected with the bracket 14 and its snug fit in relation to the moving partition 32 trues the posture of the deployed radiator during its movement in a manner to be described. The support bearing 35 is preferably a smooth material, such as "Teflon" or the like. The moving partition 32 is joined to a second bellows 39 which are connected at their opposite ends to a circular support ring 40. The bellows 39 resembles the bellows 29 in the number of folds, diameter, and maximum range of deflection. The support ring 40 is similar to the circular support member 28 previously described. The ring or member 40 is pulled snugly against an end plate 41 by a number of bolts 42 and a suitable O-ring is captured between the ring 40 and the end plate 41 to seal the bellows 39 against leakage. Access to the bellows 39 through a tapped opening at 44 is permitted.

To this juncture, the damping means 24 has been described as including a pair of bellows which are separated by the moving partition 32 with fluid communication achieved through an orifice 33 and a check valve 34. As shown in the drawings, the check valve 34 permits flow from the bellows 29 into the bellows 39. However, the check valve is so arranged to deny fluid communication in the reverse direction. Hence, the partition 32 can move reasonably rapidly to the left as viewed in FIG. 1, but moves rather slowly to the right. Movement to the right is impeded by the fluid flow through the orifice 33 only, the check valve passage 34 closing when pressure is asserted from the right-hand portion of the damping means 24. More will be noted concerning this hereinafter.

The numeral 48 indicates a closed gas-filled toroid captive in the left-hand bellows 29. It is anticipated that the deployment actuator 10 of the present invention will be used in extremely cold, near vacuum environments of the high atmosphere of outer space. The use of the gas-filled toroid 48, which is a closed chamber within the bellows 29, provides a means of compensation for thermal expansion or contraction of the fluid filling the bellows 29 and 39. Otherwise, the apparatus would be susceptible to changes in the rate of operation inasmuch as when the deployment actuator 10 is at a high elevation with respect to the Earth, the fluid flow through the orifice 33 will change, and deployment might be accomplished too rapidly. Thus, the gas container 48 tends to keep the rate of operation of the deployment actuator 10 relatively constant without regard to the thermal conditions of space at the time of use.

As described thus far, the damping means 24 incorporates the moving partition 32 which moves to the left or to the right without rotation, or deflection upwardly or downwardly. The captured ring 36 is carried with the moving partition 32. The captured ring 36 is connected to the bracket 14 with the following construction. Firstly, the ring 36 which fully encircles the damping means 24, is connected with a cylindrical wall 49. The cylindrical wall 49 terminates at the circular end plate 50 which extends fully around the damping means 24, and which interconnects with the mounting bracket 14. A portion of the ring member 50 is obscured in the upper part of FIG. 1 by the fluid outlet 15 which passes through an opening 51 in the ring member 50. The fluid outlet 15 is joined to the ring member 50 by a suitable nut and threaded eyelet assembly at 52 for fixing the movable or free end of the fluid pipe 20. The ringlike member 50 extends outwardly of the internal cylinder 49 to an external cylinder 53. As shown in the lower portions of FIG. 1, the cylinder 49 is located internally of the several turns of the pipe 20. The cylinder 53 is located outside the several turns of the pipe 20. The two are interconnected by the ring member 50, and all three of the above-described members move in unison with the captured ring 36. Thus, as the damping means 24 permits movement of the partition 32 to the right of FIG. 1 on deployment, the ring 36 captured with the partition 32 carries the concentric cylinders 39 and 53 with it. This provides a means of alignment for the mounting bracket 14 and the fluid outlet 15 such that the coolant radiator does not become canted or skewed in space during its movement.

The outer cylindrical member 53 includes a pair of inwardly directed guide pins 54 which further align and direct the movement of the deployment actuator means 10. The guide pins 54 protrude inwardly of the outside cylindrical structure 53. The guide pins are movable in helical slots 55 which aid and assist deployment of the radiator. The slots 55 are formed in a cylindrical member 56 which is joined to the back plate 25 and integrally constructed therewith. The back plate 25 can be perfectly circular and connects the cylindrical member 56 which extends from the back plate between the two cylindrical members 49 and 53 described above. The spacing between the cylindrical members 53 and 56 is such that the guide pins 54 which protrude internally of the cylinder 53 are received within the slots 55. The slots 55 preferably extend approximately 90° around the circumference of the cylindrical member 56, and the amount of lead determines the amount of extension or translation of the deployment actuator. Thus, the upper guide pin of FIG. 1 is shown at its recessed or withdrawn position, and it rotates to a point 90° around the circumference of the cylindrical member 56 which point may be a predetermined distance forward of the illustrated position of the guide pin. Thus, if the slot 55 has a lead such that the forward end is 2 inches to the right of the illustrated position in FIG. 1, the bracket 14 will be permitted to translate to the right by 2 inches. The same is true of the slot cooperative with the guide pin shown at the bottom portions OF FIG. 1 except that this slot circumscribes 90° of the cylindrical member in that portion of the apparatus cut away in the sectional view of FIG. 1. Hence, this lead slot is not shown in the drawings. The guide pins 54 cooperate with one another to maintain the bracket 14 in a noncanted or nonskewed position, as does the captured ring 36 and the other apparatus mentioned above with regard to this problem. It will be appreciated that three guide pins accomplish this result equally as well as four or more.

The deployment actuator 10 of the present apparatus should now be considered in operation. Briefly, the apparatus is attached to a spacecraft or other airplane, and the fluid inlet 16 is connected with a source of coolant fluid or the like. The outlet 15 is likewise connected to a coolant radiator or some other fluid device. The radiator or the device is secured to the projecting mounting bracket 14 to obtain the degree or structural support and integrity. Preferably, the deployable radiator is tethered or secured by apparatus not pertinent to the present invention in its withdrawn or streamlined position. At the time the deployment is desired, the radiator is released and the several turns of the hollow torsion spring cause its deployment. The full-line position of FIG. 1 is the withdrawn position, while the dotted line position is the deployed position. Deployment is achieved in the following manner.

The several turns of the tubing 20 tend to uncoil slightly, and the fluid outlet 15 moves clockwise as shown in FIG. 2. The bracket 14 moves with the fluid outlet 15. Movement of the outlet 15 forces the ringlike plate member 50 to rotate clockwise as shown in FIG. 2. Rotation of the plate 50 carries with it the connected concentric cylindrical members 49 and 53. This apparatus is guided in its movement by the guide pins 54, and the captured internal ring 36. Hence, the ring member 50 remains parallel to the upright support member 13 and moves toward it as viewed in FIG. 1. The rate of translation is determined by the damping means as a quantity of damping fluid is moved from the extended bellows 39 to the collapsed bellows 29. The flow is through the orifice 33 in the movable partition 32. Likewise, the guide pins follow the slots formed in the cylindrical member 56 and the deployment is completed.

From the foregoing, it will be noted that deployment of the bracket 14 and the outlet connection 15 is achieved at a controlled rate by operation of the damping means 24. Moreover, the control of the translation rate likewise regulates the rate of rotation. As a consequence, the deployed apparatus is not exposed to damage or harm resulting from a "whipping action" or other such action. Moreover, the rate of deployment is made essentially constant by the use of a fluid having a low rate of thermal viscosity change. It should also be recognized that damping of the translational rate may also be varied by increasing or decreasing the helix angle of slots 55 along their length.

On retraction, it is assumed that the deployed apparatus is moved by means not pertinent to the present invention. However, such movement does return the outlet connector 15 to the original full-line position of FIG. 1, and particularly, returns the movable partition 32 to its illustrated position of FIG. 1. Such movement is accomplished relatively easily inasmuch as the check valve 34 permits a substantial flow from the left to the right as viewed in FIG. 1. Hence, as the moving partition 32 is forced to the left in FIG 1, the relief valve 34 allows rapid movement.

Retraction is achieved relatively straightforwardly with the apparatus returning to the original illustrated position of FIG. 1. Consequently, the apparatus functions bidirectionally with the only difference lying in the damping rate of the means 24.

The foregoing has been directed to the preferred embodiment of the present invention. Numerous alterations or variations may be adapted without departing from the scope of the present invention. Clearly, the length of the apparatus may be altered to include longer bellows and a greater number of turns in the hollow toroid spring. Normally, it is not necessary to rotate an apparatus greater than 90° although this can be varied to a greater or lesser degree as desired. The length of translation is likewise subject to variation depending on the requirements of the particular installation. Other dimensional changes may likewise be accommodated in the apparatus.

The foregoing has been directed to the preferred embodiment of the present invention, and the terminology used in this specification is likewise adapted for the claims which are appended hereto.

We claim:

1. Apparatus for connecting a body to a fluid-communicated apparatus for hinged movement, which comprises:
   a. a fixed housing means adapted to be connected to said body;
   b. a coiled hollow tubular member having fluid communication with said body and the communicated apparatus, said tubular members being formed of a resilient material and having a tendency to uncoil upon being coiled between said body and the attached apparatus:
   c. damping means for controllably regulating the rate of uncoiling of said coiled tubular member; and
   d. a path of fluid communication through said coiled tubular member being provided from said body to the communicated apparatus and including an inlet and outlet in said tubular member for providing fluid communication therebetween.

2. The invention of claim 1 including:
   a. first and second bellows means;
   b. a moving partition between said first and second bellows means and having a path of fluid communication from the first to the second bellows means; and
   c. means connected between said movable partition of said bellows means and the outlet end of said tubular member for constraining movement of said tubular member by action of said movable partition between said first and second bellows.

3. The invention of claim 1 including a mounting bracket movable with and in near proximity to the outlet end of said tubular member, said mounting bracket being guided in its rotational movement by cooperative guide means and slot means connected between said movable bracket and fixed housing.

4. The invention of claim 1 including several turns of said tubular member formed as a hollow torsion spring with the inlet end of said tubular member being fixed with respect to said fixed housing, and further including a concentrically located first and second bellows means surrounded by the turns of said tubular member, a closed member extending across the connection between said first and second bellows means and having an orifice therethrough to permit controllable fluid flow between said bellows means, and an encircling relatively movable connector means joined to said first and second bellows and movable at a controllable rate thereby determined, said connector means being connected with the outlet end of said coiled tubular member and restraining its movement through operation of said first and second bellows means.

5. The invention of claim 4 including a gas-filled closed container placed in one of said bellows means.

6. The invention of claim 1 including:
   a. first and second bellows means;
   b. a movable partition joined between said first and second bellows means and being movable at a rate controllable by fluid flow between said bellows means;
   c. an encircling ringlike member captured within a slot formed in said movable partition extending about the exterior of said movable partition and being rotatably mounted relative thereto; and
   d. connector means extending from said rotatable ring to the outlet end of said tubular member for controlling the rate of deflection of the outlet end and limiting same to the rate of deflection of said captured ringlike member.